United States Patent
Baer et al.

(10) Patent No.: US 10,346,285 B2
(45) Date of Patent: Jul. 9, 2019

(54) INSTRUMENTATION OF USER ACTIONS IN SOFTWARE APPLICATIONS

(71) Applicant: Microsoft Technology Licensing, LLC, Redmond, WA (US)

(72) Inventors: Peter Baer, Bothell, WA (US); Anand Balachandran, Bellevue, WA (US); Dolly Sobhani, Bellevue, WA (US); Yijin Wu, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/619,043

(22) Filed: Jun. 9, 2017

(65) Prior Publication Data
US 2018/0357148 A1    Dec. 13, 2018

(51) Int. Cl.
| G06F 9/44 | (2018.01) |
| G06F 11/36 | (2006.01) |
| G06F 11/34 | (2006.01) |
| G06F 11/30 | (2006.01) |
| G06N 20/00 | (2019.01) |
| G06F 16/951 | (2019.01) |

(52) U.S. Cl.
CPC ........ *G06F 11/3644* (2013.01); *G06F 11/302* (2013.01); *G06F 11/3409* (2013.01); *G06F 16/951* (2019.01); *G06N 20/00* (2019.01)

(58) Field of Classification Search
CPC .................................................. G06F 11/3644
USPC .................................................. 717/123–133
See application file for complete search history.

(56) References Cited

U.S. PATENT DOCUMENTS

| 6,721,941 B1 * | 4/2004 | Morshed ............. G06F 11/3612 709/217 |
| 6,760,903 B1 * | 7/2004 | Morshed ............. G06F 11/3466 717/130 |
| 7,134,081 B2 * | 11/2006 | Fuller, III ............... G06F 9/451 715/735 |

(Continued)

FOREIGN PATENT DOCUMENTS

WO   2015167470 A1   11/2015

OTHER PUBLICATIONS

Gupta et al, "Dynamic Code Instrumentation to Detect and Recover from Return Address Corruption", ACM, pp. 65-71, 2006.*

(Continued)

*Primary Examiner* — Anil Khatri
(74) *Attorney, Agent, or Firm* — Schwegman Lundberg & Woessner, P.A.

(57) ABSTRACT

A method may be performed to receive and store in a database user instrumentation data and code instrumentation data from a user computing device. The user and code instrumentation data may be associated with performance of a user action of an application. The user instrumentation data may include a name identification of the user action, an input type identification of the initiation of the user action, and context data of the user action as executed. The user instrumentation data may be stored as associated with a user identification. The method may also include receiving a request from a requesting computing device to identify at least one past user action of the user. In response to receiving the request, the method may include querying the database and providing results of the query to the requesting computing device.

19 Claims, 7 Drawing Sheets

(56) References Cited

U.S. PATENT DOCUMENTS

| | | | | |
|---|---|---|---|---|
| 7,266,805 | B2* | 9/2007 | Weidman | G06F 8/71 717/101 |
| 7,702,642 | B1* | 4/2010 | Wolfman | G06F 11/3466 707/999.101 |
| 7,721,259 | B2* | 5/2010 | Heinke | G06F 9/44505 717/121 |
| 8,250,408 | B1* | 8/2012 | Cohen | G06F 11/0709 714/25 |
| 8,255,879 | B2* | 8/2012 | Wenger | G06F 11/3466 717/130 |
| 8,566,796 | B2* | 10/2013 | Cates | G06F 11/3612 717/124 |
| 8,752,019 | B2* | 6/2014 | Marquardt | G06F 11/0796 717/124 |
| 8,862,728 | B2* | 10/2014 | Jayachandran | G06F 11/0754 709/224 |
| 9,053,435 | B2* | 6/2015 | Krukow | G06F 11/3664 |
| 9,183,108 | B2* | 11/2015 | Ergan | G06F 8/443 |
| 9,354,998 | B2* | 5/2016 | Hyland | G06F 11/28 |
| 9,652,312 | B2* | 5/2017 | Selig, IV | G06F 9/44505 |
| 2006/0168335 | A1 | 7/2006 | Hodjat et al. | |
| 2007/0299631 | A1 | 12/2007 | Macbeth et al. | |
| 2009/0019396 | A1 | 1/2009 | Mccarthy | |
| 2012/0046068 | A1 | 2/2012 | Katpelly et al. | |
| 2012/0136714 | A1 | 5/2012 | Nesamoney et al. | |
| 2012/0159564 | A1 | 6/2012 | Spektor et al. | |
| 2012/0284735 | A1 | 11/2012 | Svinth | |
| 2012/0290405 | A1 | 11/2012 | Talluri | |
| 2018/0357148 | A1* | 12/2018 | Baer | G06F 11/3644 |

OTHER PUBLICATIONS

Wang et al, "SciSim: A Software Performance Estimation Framework using Source Code Instrumentation", ACM, pp. 33-41, 2008.*

Cho et al, "Instant Profiling: Instrumentation Sampling for Profiling Datacenter Applications", ACM, pp. 1-10, 2013 (Year: 2013).*

Schardl et al, "The CSI Framework for Compiler-Inserted Program Instrumentation", ACM, pp. 100-102, 2018 (Year: 2018).*

Wert et al, "Generic Instrumentation and Monitoring Description for Software Performance Evaluation" ACM, pp. 203-205, 2015 (Year: 2015).*

Madronal et al, "Automatic Instrumentation of Dataflow Applications using PAPI", ACM, pp. 232-235, 2018 (Year: 2018).*

Stein, et al., "A Conversational Model of Multimodal Interaction", In Proceedings of 11th National Conference on Artificial Intelligence, Jul. 11, 1993, pp. 1-16.

* cited by examiner

INSTRUMENTATION OF USER ACTIONS IN SOFTWARE APPLICATIONS

TECHNICAL FIELD

Embodiments described herein generally relate to application metrics and in particular to, but without limitation, instrumentation of user actions in software applications.

BACKGROUND

Reliability of features of an application may be tracked in a number of ways. For example, an engineer may code various diagnostic checks, codes, or values that are triggered during the application's execution. The diagnostics may be used to improve or troubleshoot errors during or after execution of the application. However, to people outside of the immediate area of expertise of the engineer who programmed in the codes, these codes may not be intelligible or useful. Similarly, there may not be information sharing or tracking between executing code. Furthermore, these diagnostics may be not helpful in recreating a sequence of events leading up to a crash—resulting in reliance on unstructured data from a user to describe what they were doing in order to try and solve any underlying problems.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

DETAILED DESCRIPTION

Figure 1:
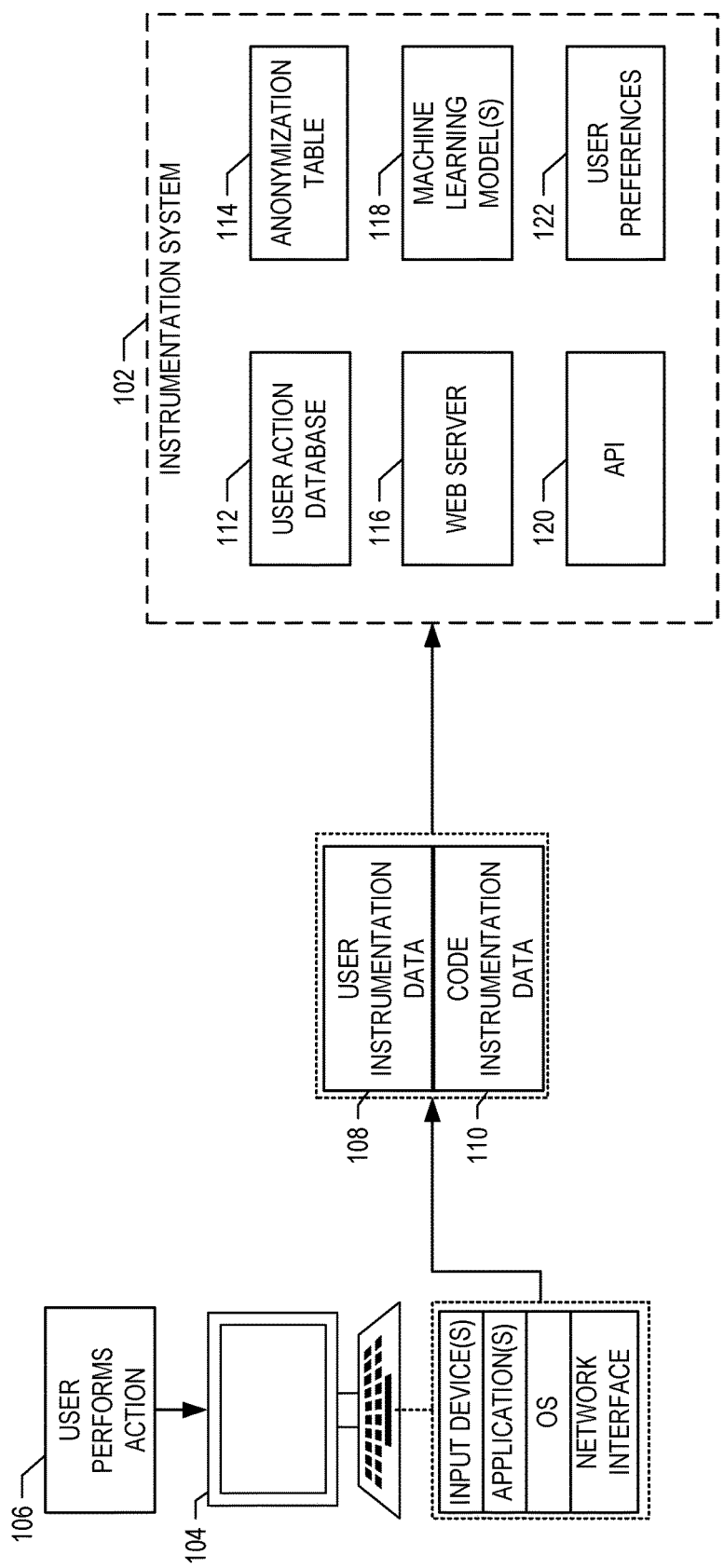
FIG. 1 illustrates an overview of an instrumentation system, according to various examples.

In the following description, for purposes of explanation, numerous specific details are set forth in order to provide a thorough understanding of some example implementations. It will be evident, however, to one skilled in the art that that the subject matter described herein invention may be practiced without all of these specific details.

Knowing what action that a user is taking in a software application and the context around the action is valuable for diagnosing problems and making improvement to the application. For a given application, there are sometimes hundreds of actions a user may take and just as many contexts. In some instances, system (e.g., an application) health instrumentation data may be collected that indicates whether or not a specific activity (e.g., code segment) was run, if the activity was successful, if the result of the code execution was expected, etc. However, health instrumentation data (also referred to herein as code instrumentation data or activity data) is generally inserted by the engineer(s) who wrote the activity code. The names used for diagnostics may not have semantic meaning outside of the engineer(s) who coded the activity. Accordingly, data analysts or data scientists may not be able to understand the health instrumentation data without access to the engineer(s).

Accordingly, the health instrumentation data alone may lead to an incomplete story of user action (or usage) instrumentation data. Various examples herein describe a more robust and complete instrumentation model and data schema to support tracking of user actions—while at the same time providing users with privacy controls to restrict access to their respective usage data. User action data may include not merely what a user clicked, but the context around the click. For example, hitting delete on a slide in a presentation application may be different than hitting delete while editing slide typographic content.

Code instrumentation data often lacks the context of even what initiated an action. For example, an auto-save feature may invoke similar code as a user-initiated save, but the code instrumentation data may not make a distinction. Therefore, if a data analyst is attempting to diagnose an activity related to "save," they may not be able to know if the problem is related to auto-save, a user-initiated save, or both. Furthermore, code instrumentation data may not have inherent time correlation information to recreate the sequence of events leading up to a crash of an application. This may lead to a time-consuming process of stitching together code instrumentation data or relying on the user for an explanation of what they were doing.

Separating code instrumentation data from user instrumentation data may provide a number of benefits when compared with extending code instrumentation data to track this information. For example, user instrumentation data may be tied back to a specific user account. Accordingly, stricter storage requirements, with respect to privacy, may be applied when data is tied to an account. By storing user instrumentation data and code instrumentation data differently, diagnostic code may not need to be rewritten.

Another benefit is the cost of data retention as the code instrumentation data may include more data than user instrumentation data. Thus, the lower level signals of the code instrumentation data may be stored for less time than the relatively higher-level signals of the user instrumentation data. In other words, user instrumentation data may be less sample-resistant than code instrumentation data; it is lower-volume and higher-value on a per-device basis. It may be useful to be able to keep all usage data from all users in order to provide the better value and support experience to the users. Code instrumentation data, on the other hand, may retain most of its value if sampled correctly (e.g., not saving all of the data). Having distinct data sets for code instrumentation data and user instrumentation data allows flexibility to apply different sampling policies.

User instrumentation data may be used to alleviate some or all of the above challenges in various examples discussed herein. For example, user instrumentation data may provide a standard semantic model for how user actions and responses to those actions are represented. In some examples, user actions represent intent on the part of the user. Code instrumentation data may be used to represent any code execution and therefore may be associated with background or indirect tasks as well (e.g., file sync, spell check, storage optimization, etc.). Using user instrumentation data, it may be able to determine what object a user acted upon, in what order, etc. To this end, an engineer may label user events according to an application programming interface schema that is understandable to a wide audience (e.g., relate to the actual user behavior) to enable consumers with a user-centric focus to use the data. In other words, the consumers may not need to have familiarity with the code itself.

In an example, during execution of an application, the user instrumentation data may be collected for all users (except those who have explicitly opted out of System Metadata, such as the user actions discussed in more detail below, collection) with no sampling. This may permit reconstructing user behavior history of any user. The user instrumentation data may also be correlatable to code instrumentation data, as well as custom instrumentation events that occur in the context of the user action. A user may be able to view, in real-time, the data collected and restrict or delete access to the user instrumentation data.

FIG. 1 illustrates an overview of an instrumentation system, according to various examples. The overview includes instrumentation system 102, user device 104, user action 106, user instrumentation data 108, and code instrumentation data 110. Instrumentation system 102 is illustrated as including user action database 112, anonymization table 114, web server 116, machine learning model 118, application programming interface (API) 120, and user preferences 122.

Figure 7:
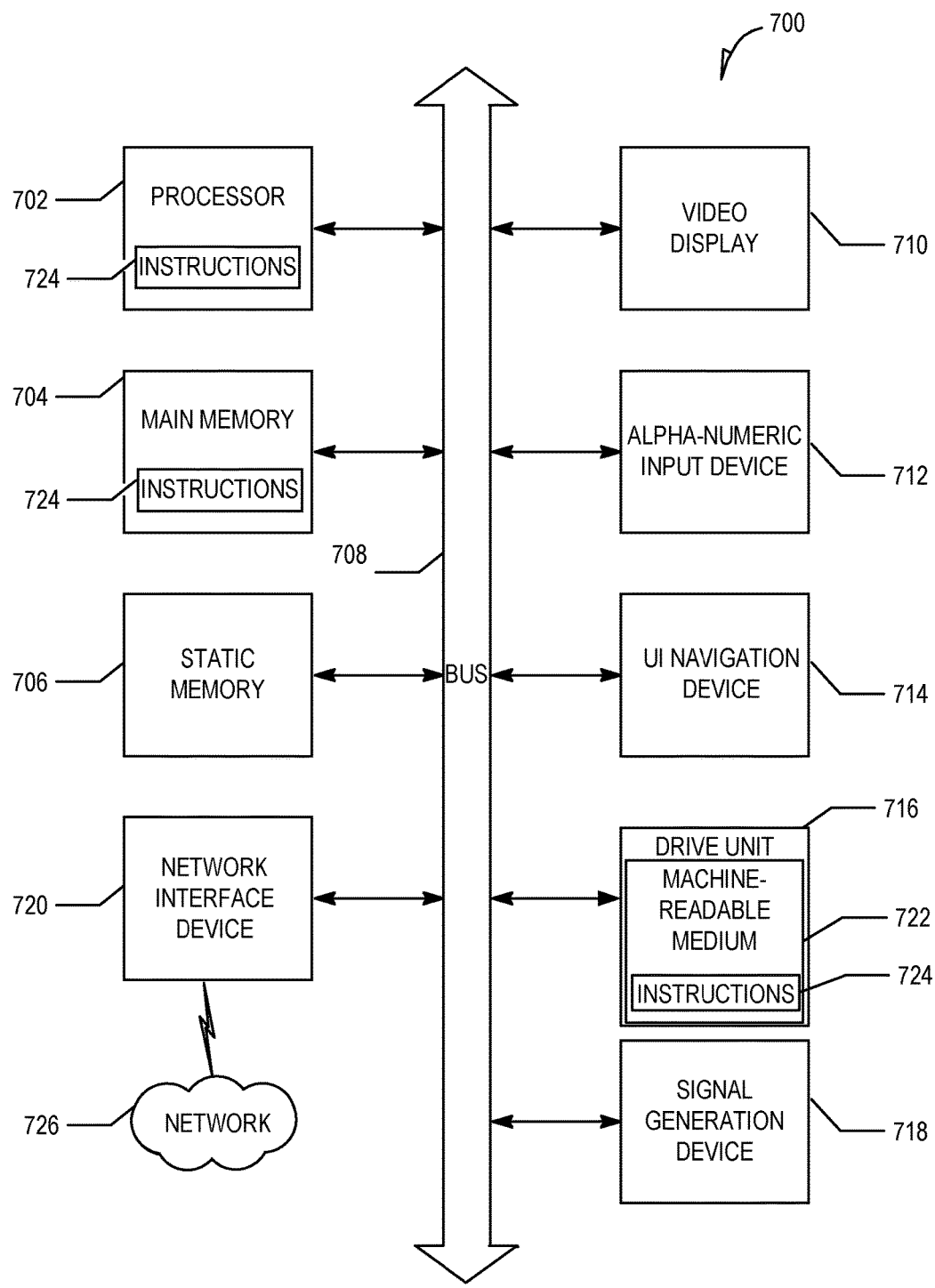
FIG. 7 is a block diagram illustrating an example machine upon which any one or more of the techniques (e.g., methodologies) discussed herein may be performed, according to an example embodiment.

For illustration purposes, instrumentation system 102 is illustrated as a set of separate components. However, the functionality of individual components may be performed by a single component. A component may represent computer program code that is executable by a processing unit (e.g., a core of a general purpose computer processor, a graphical processing unit, an application specific integrated circuit, etc.) The program code may be stored on a storage device and loaded into a memory of the processing unit for execution. Portions of the program code may be executed in a parallel across multiple processing units. Execution of the code may be performed on a single device or distributed across multiple devices. In some examples, the program code is executed on a cloud platform (e.g., MICROSOFT AZURE® or AMAZON EC2®) using a shared computing infrastructure. In an example, one or more computing devices such as illustrated in FIG. 7, may be used to carry out the functionality described with respect to instrumentation system 102.

In an example, user device 104 is a computing device (e.g., tablet, laptop, desktop computer, mobile phone) that includes, among other components, inputs devices, applications, an operating system, and a network interface. A user may interact with user device 104 using one or more input devices (e.g., touch screen, gesture, voice, keyboard, mouse, etc.). User action 106 may include an interaction with user device 104 by the user using one of the input devices.

The operating system (OS) of user device 104, may be an event-driven operating system. For example, the device drivers for the input devices may notify the OS of an input event. The OS may define an API for developers to use for processing of the received input events (e.g., on click, on drag, etc.). Then, if the event occurs while the application is active (e.g., is in the foreground), the relevant code for the application associated with the input event may be executed on a processor of user device 104. For example, the application may display a set of sub-options in response to a user clicking on a top-level option. Although many of the examples discussed herein address a scenario where the application is downloaded and executing on a user device, user actions within a web application may be similarly tracked.

A user event schema may be used by a developer for each user action. An example user event schema may be defined as:

TABLE 1

| Field | Type | Description |
|---|---|---|
| Name | string | The feature the action is associated with. Multiple actions may be part of the same Feature. Sub-features can be expressed via hierarchical name ("Feature.SubFeature") |
| InputType | string | Mouse, Touch, Keyboard, Voice, etc. |

Or as a data object:

```
[EventContract]
struct UserAction
{
    string Name; // The action name (Application.Feature.VerbNoun)
    string InputType; // Mouse, Touch, Keyboard, Voice, etc.
}
```

In various examples, the event name reflects the code that is handling the dispatch of the user action. For example, there may be a single event name (and associated custom context) for a gallery item click, even though there are many features that leverage galleries. The semantics of the specific UI control being clicked on and the feature that it is associated with may be represented in user event schema as shown above.

An example filled-in event schema may be:
Event.Name: Office.Xaml.Gallery.Click (This may be defined by the engineer and refers to the instrumented code location)
UserAction.Name: OneNote.Navigation.NavigateToSection (This may be defined according to a product manager or data scientist)
UserAction.InputType: Mouse
+custom data fields (Data. *) specific to the event . . . .

In various examples, the name "leaf" portion of UserAction describes the semantic action being taken (e.g., it may contain a verb+noun). By using a semantic vocabulary, product managers and data scientists may define a user-centric hierarchy of features that is independent of the "physical" implementation of those features defined by the engineers.

The base schema may only require the Name and InputType; however, the custom data fields may be used to provide context surrounding the user event. The context may be important to understand why a user initiated the action, what they were doing before, if there was one selection vs multiple selections, and so forth. For example, knowing that "Bold" was executed is not enough if you want to answer the question "do users typically toggle Bold at an insertion point and then type, or do they select already-typed text and then toggle Bold?"

Just like the user action names, a standardized set of additional contexts may be defined. The context may be expressed as Data Contracts (e.g., DocumentManipulationAction) that may be supplied as additional custom context on the event. The current Document ID applies to almost all actions and sometimes many non-action events as well.

Thus, in some examples, the event schema may require the document ID. In some examples, a base schema may be shared by many actions.

The table below illustrates a few examples defined event contracts:

TABLE 2

| Event Name | Event Contract (UserAction) | Custom Context |
| --- | --- | --- |
| Office.Xaml.Gallery.Click | Name: OneNote.Navigation.NavigateToSection<br>InputType: Mouse | ItemTelemetryId: . . .<br>GroupIndex: . . .<br>ItemIndex: . . . |
| Office.Xaml.Slider.Drag | Name: Document.Zoom<br>InputType: Mouse | OldValue: . . .<br>NewValue: . . . |
| Office.Xaml.Checkbox.Click | Name: TrustCenter.TogglePersonalization<br>InputType: Touch | Value: . . .<br>IsChecked: . . .<br>IsIntermediate: . . . |
| Office.Word.AggTyping | Name: Document.ManipulateText<br>InputType: Keyboard | DurationInMs: 2334<br>CharactersTyped: 12 |

As an application executes, the data defined in the event contract, for the various performed user actions, may be saved as user instrumentation data 108. Periodically, or in real-time, user instrumentation data 108 may be transmitted to instrumentation system 102 as discussed in further detail below. In addition, to user instrumentation data 108 associated with the user actions, code instrumentation data 110 may be collected.

As discussed above, code instrumentation data 110 may be a data contract (e.g., data object defined according to a schema or API) that is associated with execution of an activity. For example, some base code instrumentation data may include a name, an event type, and optional data may include a start time, an end time, the number of times the activity was run, the duration of the execution time, an intended audience, client identifiers, etc. Additional data that may be useful for health (e.g., performance) metrics of the activity may also be defined by the engineer.

Figure 2:
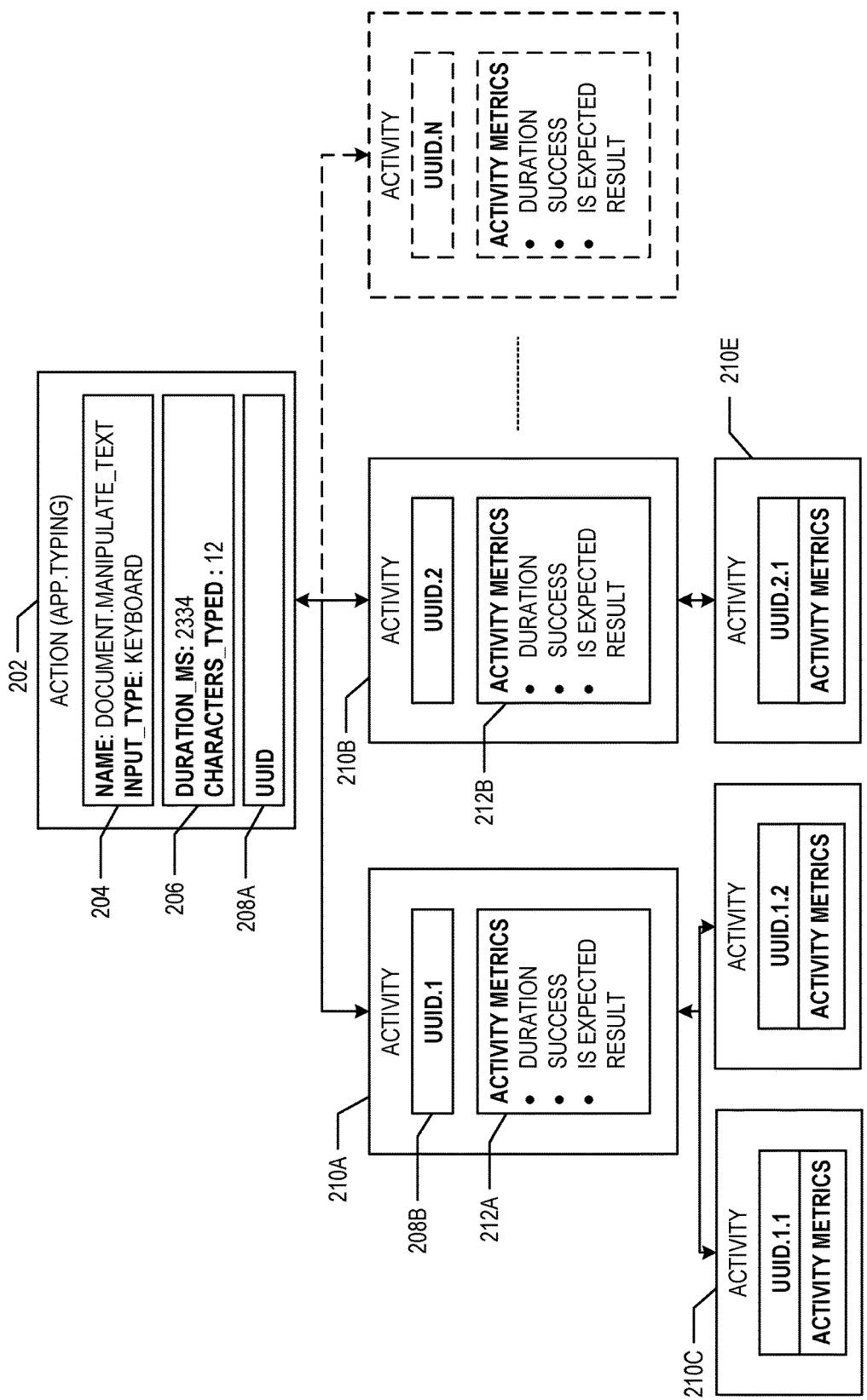
FIG. 2 illustrates a schematic representation of a user action and a set of activities, according to various examples.

FIG. 2 illustrates a schematic representation of a user action and a set of activities, according to various examples. A user action is able to be correlated with activities (e.g., code routines or segments) that run to implement the action. Each activity may call other activities, which may call other activities, and so forth. FIG. 2 includes user action 202, user instrumentation identification 204, user instrumentation context 206, correlation vectors 208, activities 210, and activity metrics 212.

In the situation depicted in FIG. 2, consider that a user is using a word processor and has entered text using a keyboard (e.g., user action 106). Accordingly, user action 202 includes an example event name "App.Typing," which may identify the actual code that starts executing to implement the user action. User activity 202 also includes user instrumentation identification 204 that identify an event contract name and input type, according to the schema described previously. User instrumentation context 206 may represent values corresponding to optional context fields defined by the engineer or product manager Collectively, user instrumentation identification 204 and user instrumentation context 206 may be considered user instrumentation data (e.g., user instrumentation data 108). Activity metrics 212 may considered code instrumentation data as discussed above.

User action 202 may generate correlation vector 208A in response to the user initiating the action. A correlation vector may begin with a base64 encoded universally unique identifier (UUID). Other identifier types and encodings may be used without departing from the scope of this disclosure. A new UUID may be generated each time the user performs the action. The correlation vector may be extended using dot separated values (e.g., UUID.X.Y.Z).

Each activity that receives a correlation vector may extend the correlation vector, but may not change what has been received. For example, the root correlation vector 208A may be set by user action 202. User action 202 may call activities 210A and 210B as part of implementing the user typing action. Because user action 202 controls the root correlation vector, it may extend the correlation vector to UUID.1 to UUID.N. Accordingly, when calling activity 210A, correlation vector 208B (UUID.1) may be passed as a parameter, or may be retrieved on thread-local storage. Activity 210A may, in turn, extend the correlation vector to any activity it calls. For example, activity 210A may assign UUID.1.1 to activity 210C whereas activity 210B may extend its correlation vector UUID.2 to UUID.2.1 and assign it to activity 210E.

The correlation vector at any given level (e.g., UUID.1 UUID.1.1, etc.) may be used as an identifier for the activity metrics collected for the activity. For example, activity metrics 212A may be tagged (e.g., transmitted with) correlation vector 208B. Accordingly, by examining correlation vector 208B a data scientist may determine that user action 202 is what prompted the execution activity 210A.

The data scientist may then also be able to examine user instrumentation context 206 during execution of activity 210A Similarly, activity metrics of activity 210E may be tagged with a correlation vector of UUID.2.1, which may signify that the activity assigned UUID.2 (activity 210B) was responsible for initiating execution of activity 210E, but it was ultimately the result of user action 202. Consequently, correlation vectors allow the recreation of an order of execution of activities with respect to a user action. Thus, a data scientist may be able to query a database (discussed further below) and see how often the activities that were called by the action were run, and how often they were successful, etc.

With reference back to FIG. 1, user instrumentation data 108 and code instrumentation data 110 (e.g., such as depicted in FIG. 2) may be transmitted to instrumentation system 102 over a network where it may be processed and stored in user action database 112. The network may include local-area networks (LAN), wide-area networks (WAN), wireless networks (e.g., 802.11 or cellular network), the Public Switched Telephone Network (PSTN) network, ad hoc networks, cellular, personal area networks or peer-to-peer (e.g., Bluetooth®, Wi-Fi Direct), or other combinations or permutations of network protocols and network types. The network may include a single local area network (LAN) or wide-area network (WAN), or combinations of LAN's or WAN's, such as the Internet.

In an example, instrumentation system 102 includes API 120. An API provides a method for computing processes to exchange data. A web-based API, such as API 120, may permit communications between two or more computing devices. The API may define a set of HTTP calls according to Representational State Transfer (RESTful) practices.

A RESTful API may define various GET, PUT, POST, DELETE methods to create, replace, update, and delete data stored on a database of instrumentation system 102. For example, "GET/actions/userid" may be used to retrieve user action activity data for the designated ID. The same endpoint may be reused to add user action data using "PUT/actions/userid." Data transmitted to, and received from web server 116 via API 120 may be encoded in the JavaScript Object Notation (JSON) format and submitted in the content portion of the PUT request.

Because of the sensitive nature of data stored within API 120, various security measures may be used to protect data at rest and in transit. For example, API 120 may use tokens or API keys to ensure only authorized parties may retrieve or update information at instrumentation system 102. Additionally, data transmitted over the network may use a cryptographic protocol, such Secure Socket Layer (SSL) or Transport Layer Security (TLS). As a further security precaution, the transmitted data itself may be encrypted, separately from the SSL or TLS encryption. Public-key infrastructure (PKI) may be leveraged for SSL/TLS, as well as the separate data encryption.

The specific storage layout and model used by user action database 112 may take a number of forms—indeed, each database may utilize multiple models. The database may be, but is not limited to, a relational database (e.g., SQL), non-relational database (NoSQL) a flat file database, object model, document details model, or a file system hierarchy. The user action database 112 may store data on one or more storage devices (e.g., a hard disk, random access memory (RAM), etc.). The storage devices may be in standalone arrays, part of one or more servers, and may be located in one or more geographic areas. In an example, a separate data store is used for each user; however, many of the examples discussed assume a single user action database. In some example, user instrumentation data is stored separately from code instrumentation data in a code database. In an example, code instrumentation data is anonymized as stored with no ability to trace back to an individual user (e.g., no anonymization table is used).

To further protect user privacy, user instrumentation data 108 and code instrumentation data 110 may be stored in user action database 112 as associated with an anonymized user identification. A mapping between the actual user identifier (e.g., as given to a subscriber of an application service) and the anonymized user identification may be stored in anonymization table 114. The anonymized user identification may be a hashed value. The data, as stored in user action database 112, may be also be encrypted when at rest.

In various examples, data in user action database 112 may be used with one or more machine learning models 118. The data may be used as training data for the models as well as inputs to determine an expected output. For example, a machine learning model may be trained on the order of actions taken by a user. Thus, the machine learning model may output that for the sequence of actions "A, B, C" in an application, 95% of users change a layout preference to Z. Accordingly, an instruction may be transmitted from instrumentation system 102 to user device 104 to configure the application with preference Z if the system notices the user performing A, B, C. Other examples may include, if instrumentation system 102 notices the user writing a document with a large amount of legal language (e.g., as determined by a predetermined ontology), then the system may determine the user might be a lawyer and therefore tailor the user's application to suit that style of writing (e.g., show different templates, different grammar suggestions). Or, consider that a user is a spreadsheet application and is using a lot of commands related to accounting functions, certain default formatting may be set, etc.

Figure 3:
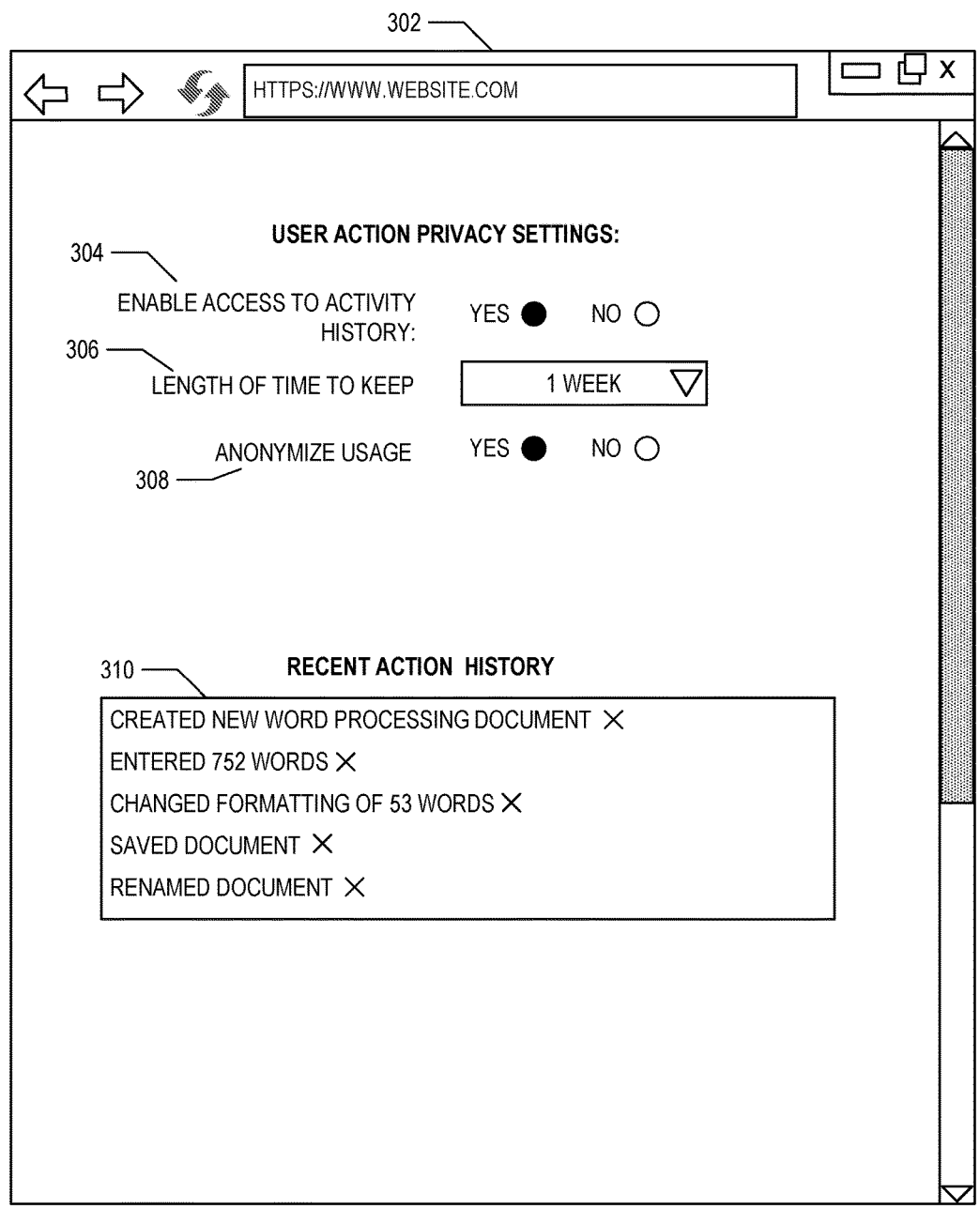
FIG. 3 illustrates a user interface of a user dashboard, according to various examples.

In an example, user preferences 122 indicate the level of access to user instrumentation data of the user to other entities. The entities may be data scientists or other applications. FIG. 3 illustrates a user interface of a user dashboard 302, according to various examples. User dashboard 302 includes access history preference 304, time preference 306, anonymize preference 308, and action history 310. The layout of user dashboard 302 is an example layout and other layouts may be used. Similarly, the preferences and actions may be displayed on different user interface panes in various examples. Although FIG. 3 illustrates a user preference being set and viewed in a web browser, the preferences may be accessed in other manners, such as directly accessed in an application, for example.

A user may access user dashboard 302 by logging into instrumentation system 102 via web server 116. For example, the user may use a web browser that has been downloaded on user device 104 or was preinstalled. Upon opening the application, the user may navigate to a login web page that is served by web server 116 that includes an input for user credentials. Serving or providing a webpage may include transmitting (e.g., sometimes referred to as presenting) web content 140—such as a Hypertext Markup Language (HTML) document to user device 102. The web content 140 may be processed by a layout or rendering engine (e.g., Webkit, Blink Gecko) and display graphics and text element on a display device of user device 104. Web server 116 may present user dashboard 302 with information received from user action database 112 and user preferences 122 according to the user credentials entered by the user (e.g., different user interfaces may be presented for an end-user vs a data scientist). In some examples, a translation between the user entered credentials and the user identification used in user action database 112 may be performed using anonymization table 114.

Access history preference 304 may be a global preference indicating whether or not the user permits access to user instrumentation data collected during execution of one or more applications. Time preference 306 may provide the user with an option of the length of time that user instrumentation data is stored in user action database 112. The user may also have the option of anonymizing their data using anonymize preference 308.

In an example, action history 310 shows the most recent actions collected in user action database 112 (e.g., the five most recent actions) in a list view on user dashboard 302. More or fewer actions may be accessed using user interface controls (not illustrated). An 'X' element may be presented to each item in the list that may be used to delete an individual action. The level of detail (e.g., fidelity) presented in action history 310 may also be set by the user. In FIG. 3, action history 310 shows a less than full fidelity level view of the information than the actions actually performed by the user. For example, there is no indication of the name of a document or what the document was renamed. In some examples, user instrumentation data is modified to a less than full level of fidelity before transmission to instrumentation system 102.

Figure 4:
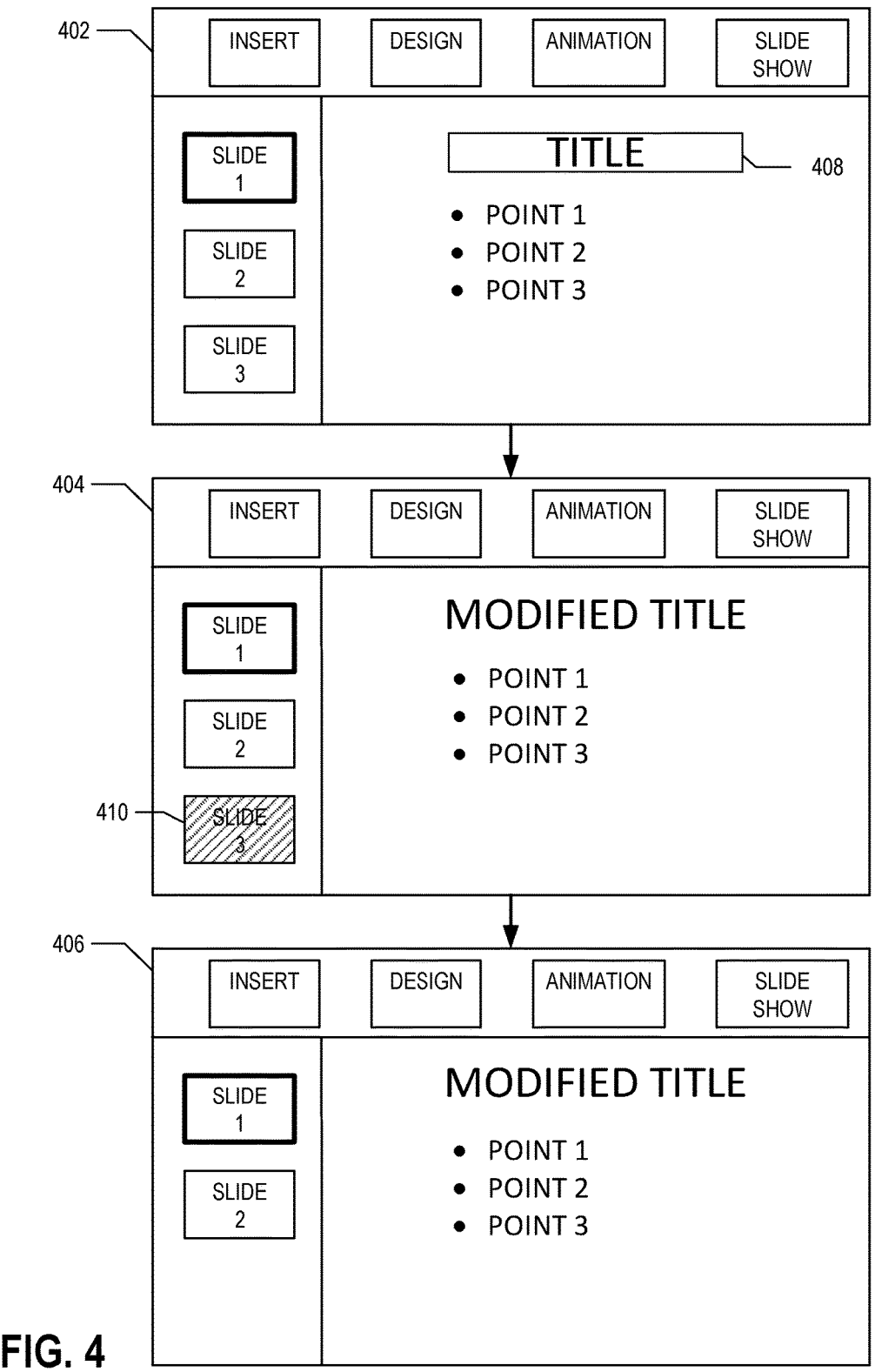
FIG. 4 illustrates an abstracted view of user actions with respect to a presentation application, according to various examples.

An entity other than the end-user may also be able to view user instrumentation data. In some examples, a data scientist is able to view the highest level of fidelity of user actions beyond actually knowing the content typed and edited. For example, FIG. 4 illustrates an abstracted view of user actions with respect to a presentation application. At view 402, it can be seen that there is a presentation with three slides and that the first slide is selected. It can also be seen that there a title with three bullet points; however, neither the actual title nor bullet point content is shown. Furthermore, there is an indication 408 that the title is selected. Then, at view 404 the title has been changed and there is an indication 410 that slide 3 is selected Finally, at view 406 it is seen that slide 3 was deleted.

In various examples, a data scientist may log in to instrumentation system 102 and access data such as presented in FIG. 4. Instrumentation system 102 may present a user interface to the data scientist that permits request for user action histories, queries for specific user actions, etc. A search across multiple users may also be made (e.g., how often was action 'A' taken in the past day). In some instances, actions leading up to a crash (as reported by an application running on user device 104) may be displayed. In addition to, or instead or, a graphic representation of the user actions, a textual description based on the underlying user instrumentation data names may be presented to the data scientist. For example, "The user inserted a slide, clicked on title of the slide, typed 20 characters, dragged a picture from the "my pictures" folder into the presentation application." Thus, the data scientist may be able to reconstruct an abstracted version of the actual actions the user took leading up to the crash.

The data scientist may also be able to gather data for training a machine learning model. Based on the machine learning model, the data scientist may also define actions to take based on the classification of user actions according to a machine learning model. Thus, if the machine learning model indicates a user formats a page to A4 every time X, Y, and Z occur, the data scientist may define a rule that if X, Y, Z are sent to instrumentation system 102, a command may be transmitted to format the current page to A4.

Figure 5:
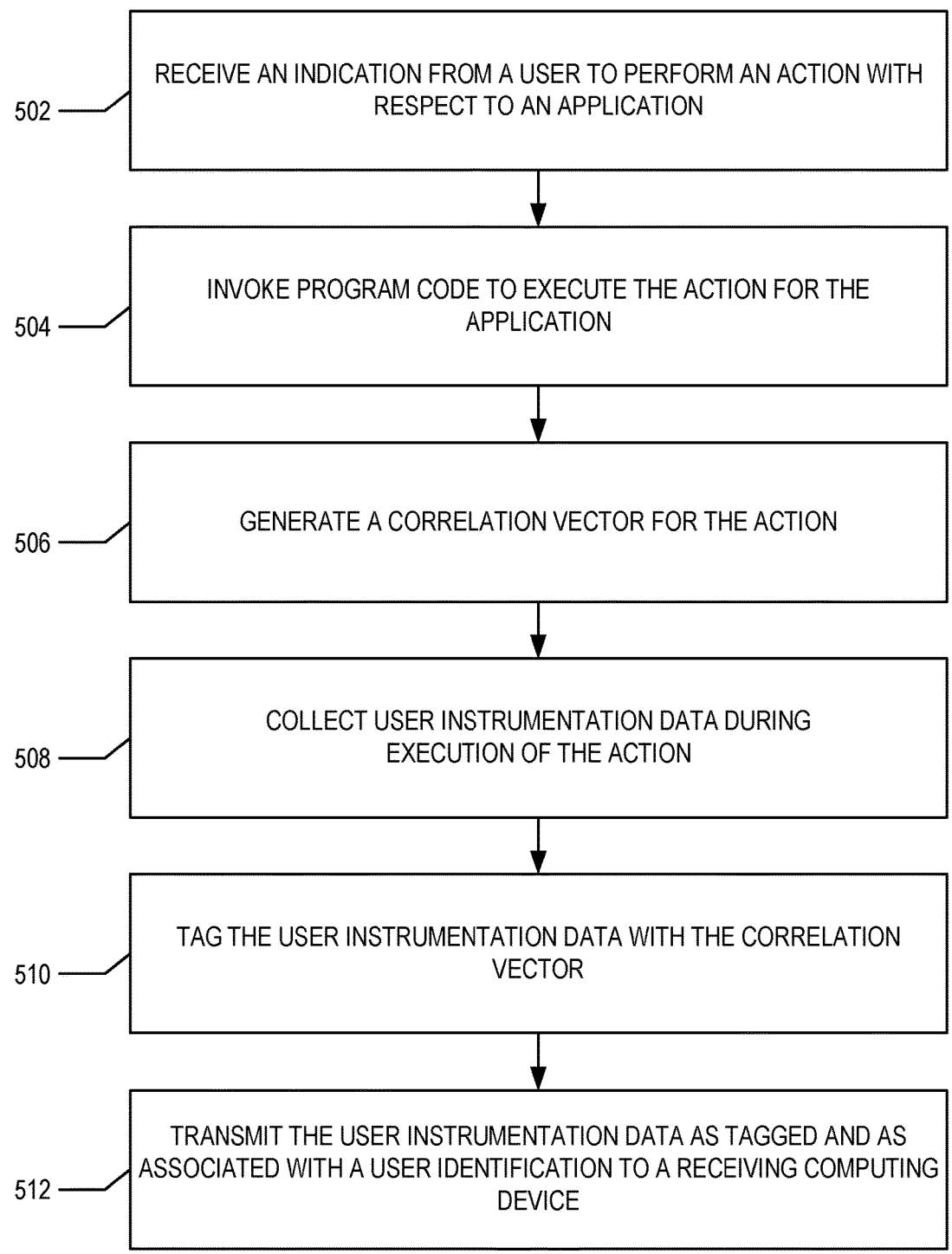
FIG. 5 illustrates a flowchart of a method of transmitting user instrumentation data, according to various examples.

FIG. 5 illustrates a flowchart of a method of transmitting user instrumentation data, according to various examples. The flowchart illustrates a series of operations (502-512) that may be performed by one or more computing devices (e.g., computer system 700). Machine-readable code may be stored on the computing device and executed by a processing unit of the computing device. The executing code may configure and control other components of the computing device to perform the operations in the machine-readable code. For example, the processing unit may transmit instructions to a network interface to transmit a data stream or may instruct a storage device to store or delete data.

At 502, in an example, an indication from a user to perform an action (e.g., add a picture, type, quit an application) is received with respect to an application. The indication may come from an operating system based on an input device being used by a user. At 504, in an example, program code to execute the action for the application may be invoked. For example, code may be loaded into memory and executed. The location of the code may be based in part on the name of the action.

In an example, the application may generate a correlation vector for the action (operation 506). The correlation vector may be a base64 UUID. At operation 506, in an example, user instrumentation data is collected during execution of the code for the action, the user instrumentation data identifying a context of the application with respect to the action. The context may include objects the user has selected, the state of an application, where a user's input device is pointed, etc. The user instrumentation data may be tagged with the generated correlation vector (option 510).

Executing the action may also include executing one or more other sections of code that may collect code instrumentation data. A section of code may extend the correlation vector and tag collected code instrumentation data with the extended correlation vector.

At operation 512, in an example, the user instrumentation data as tagged and as associated with a user identification may be transmitted to a receiving computing device. The receiving computing device may be part of a data center associated with the developer of the application. The user identification may be an identification given to, or set by, the user with respect to the application. In some examples, the same user identification may be used across a suite of applications. The user instrumentation data may be transmitted according to an API defined by the receiving computing device.

Figure 6:
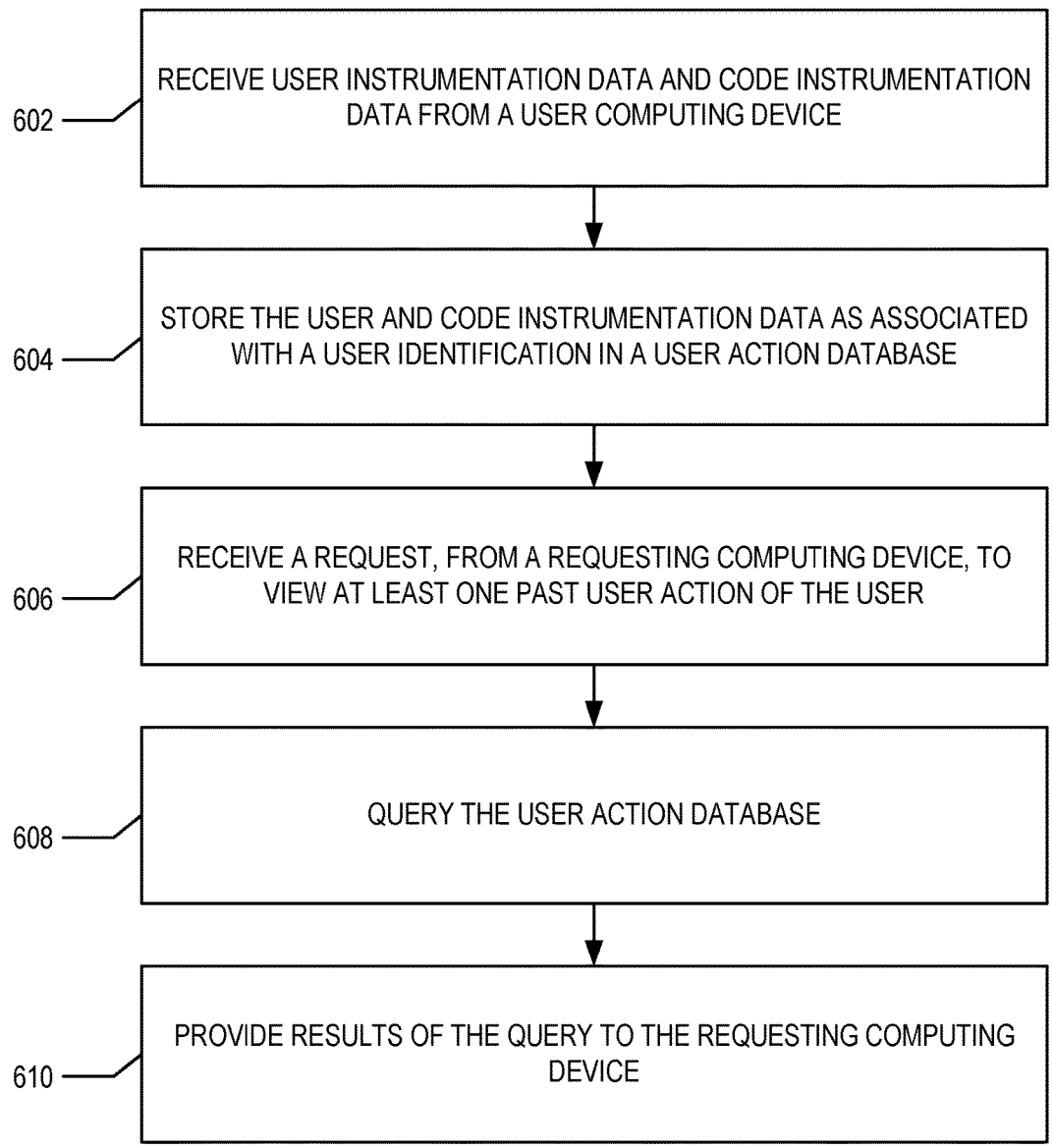
FIG. 6 illustrates a flowchart of a method of processing instrumentation data, according to various examples.

FIG. 6 illustrates a flowchart of a method of processing instrumentation data, according to various examples. The flowchart illustrates a series of operations (602-612) that may be performed by one or more computing devices (e.g., computer system 700). Machine-readable code may be stored on the computing device and executed by a processing unit of the computing device. The executing code may configure and control other components of the computing device to perform the operations in the machine-readable code. For example, the processing unit may transmit instructions to a network interface to transmit a data stream or may instruct a storage device to store or delete data.

In an example, at operation 602 user instrumentation data and code instrumentation data are received from a user computing device. The user instrumentation data and code instrumentation data may be received via an API. A user identification may also be sent with the code instrumentation data and user instrumentation data. The user and code instrumentation data may be associated with performance of a user action (e.g., clicking a button, changing a view) of an application. The application may have been executed on the user computing device. The user instrumentation data may include a name identification of the user action, an input type identification of the initiation of the user action, and context data of the user action as executed. The user instrumentation data may conform to previously defined schema. The user and code instrumentation data may be transmitted in a JSON format.

In an example, at operation 604, the user and code instrumentation data are stored as associated with a user identification in a database (e.g., in a user action database, a code database, or both). Associated may mean that the user identification and the user instrumentation data are stored in the same row of a database. In some examples, a user action database is separately maintained for each user. In some examples, the user instrumentation data is stored as associated with the user identification, but the code instrumentation data may be anonymized. In an example, the anonymized code instrumentation data is stored in a separate database in addition to the user instrumentation data. Thus, analysis may be performed on code anonymized instrumentation data collected from multiple users regardless of privacy settings of a user with respect to user instrumentation data.

In an example, at operation 606 a request may be received from a requesting computing device to identify at least one past user action of the user. The request to identify may include a request to view the at least one past user action in a user interface. The requesting computing device may be the same as the user computing device or a different computing device. For example, the requesting computing device may be a data scientist or a customer service representative who is trying to diagnose a problem associated with the user action. The request may be initiated by a user entering search terms into an input form.

The request may include credentials. The credentials may be tied to different access and edit rights with respect to the data stored in the user action database. For example, if the credentials correspond to the user of the application, the access rights may indicate the user may delete data stored in the user action database. In some examples the access rights may indicate a level of fidelity allowed with respect to user actions. For example, one level of fidelity may permit knowing how many slides were edited during an application session, whereas a higher level of fidelity may permit knowing what types of edits were made to the slides during the session. In an example, the user is authenticated as the user associated with the user action of the application (e.g., the user who performed the action) before providing results of a subsequent query to a requesting computing device. For example, a check may be made if the credentials match the user identification received previously.

In an example, the request made at operation 606 may identify a target user action and at operation 608. The user action database be queried in response to the request. The target user action may be identified by a name of the action. Results of the request may identify a set of user actions performed prior to the target user action. For example, the last five user actions before the target user action may be returned in response to the query.

Results of the query may be providing to the requesting computing device, in an example, at operation 610. The results may be modified (e.g., abstracted) based on the access rights of the requesting user. Accordingly, providing may include transmitting a user interface for presentation that includes a modified (e.g., less than full fidelity view) of user entered content associated with the at least one past action and set of user actions.

In an example, the results of the query identify code instrumentation data associated with program code executed for the target user action. The code instrumentation data indicating a success rate of the program code. The code instrumentation data may be tagged with a correlation vector that was assigned by the target user action.

In some examples, providing results of the query may include providing an option to revoke access to data associated with the at least one past user action of the user. In an example, a user may maintain access to data but prevent other entities from accessing the data. Providing may include transmitting webpage data for presentation on the requesting computing device, including user interface elements to set or edit user preferences. The webpage may also present an option to delete data stored in the user action database associated with the user-assuming the user has the correct access rights.

In some examples, the method may further include inputting past user actions from the user action database into a machine learning model. Inputting may include generating a vector based on the user actions (e.g., converting a user action to a respective predetermined numerical value). The output of the machine learning model may indicate the likelihood that the past user actions are associated with a certain use case (e.g., accounting, legal, novice user). Then, instructions may be transmitted to the user computing device to modify a behavior of the application based on an output of the machine learning model. For example, the different use cases may be associated with different templates that are presented to a user when generating a new document in the application.

Embodiments described herein may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples, as described herein, may include, or may operate on, logic or a number of components, subsystems, or mechanisms. Components may be hardware, software, or firmware communicatively coupled to one or more processors in order to carry out the operations described herein. Components may be hardware components, and as such components may be considered tangible entities capable of performing specified operations and may be configured or arranged in a certain manner. In an example, circuits may be arranged (e.g., internally or with respect to external entities such as other circuits) in a specified manner as a component. In an example, the whole or part of one or more computer systems (e.g., a standalone, client or server computer system) or one or more hardware processors may be configured by firmware or software (e.g., instructions, an application portion, or an application) as a component that operates to perform specified operations. In an example, the software may reside on a machine-readable medium.

In an example, the software, when executed by the underlying hardware of the component, causes the hardware to perform the specified operations. Accordingly, the term hardware component is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which components are temporarily configured, each of the components need not be instantiated at any one moment in time. For example, where the components comprise a general-purpose hardware processor configured using software; the general-purpose hardware processor may be configured as respective different components at different times. Software may accordingly configure a hardware processor, for example, to constitute a particular component at one instance of time and to constitute a different component at a different instance of time. Components may also be software or firmware components, which operate to perform the methodologies described herein.

FIG. 7 is a block diagram illustrating a machine in the example form of a computer system 700, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 700 includes processing circuitry 702 (e.g., a central processing unit (CPU), a graphics processing unit (GPU) or both, processor cores, compute nodes, etc.), a main memory 704 and a static memory 706, which communicate with each other via a link 708 (e.g., bus). The computer system 700 may further include a video display unit 710, an alphanumeric input device 712 (e.g., a keyboard), and a user interface (UI) navigation device 714 (e.g., a mouse). In one embodiment, the video display unit 710, input device 712 and UI navigation device 714 are incorporated into a touch screen display. The computer system 700 may additionally include a storage device 716 (e.g., a drive unit), a signal generation device 718 (e.g., a speaker), a network interface device 720, and one or more sensors (not shown), such as a global positioning system (GPS) sensor, compass, accelerometer, or other sensors.

The storage device 716 includes a machine-readable medium 722 on which is stored one or more sets of data structures and instructions 724 (e.g., software) embodying or utilized by any one or more of the methodologies or functions described herein. The instructions 724 may also reside, completely or at least partially, within the main memory 704, static memory 706, and/or within the processing circuitry 702 during execution thereof by the computer system 700, with the main memory 704, static memory 706, and the processing circuitry 702 also constituting machine-readable media.

While the machine-readable medium 722 is illustrated in an example embodiment to be a single medium, the term "machine-readable medium" may include a single medium or multiple media (e.g., a centralized or distributed database, and/or associated caches and servers) that store the one or more instructions 724. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 724 may further be transmitted or received over a communications network 726 using a transmission medium via the network interface device 720 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

What is claimed is:

1. A method comprising:
   receiving user instrumentation data and code instrumentation data from a user computing device, the user and code instrumentation data associated with performance of a user action of an application, wherein the user instrumentation data includes:
   a name identification of the user action;
   an input type identification of the initiation of the user action; and
   context data of the user action as executed;
   storing the user and code instrumentation data in a database, wherein the user instrumentation data is stored as associated with a user identification;
   receiving a request, from a requesting computing device, to identify at least one past user action of the user;
   in response to receiving the request, querying the database;
   providing results of the query to the requesting computing device;
   inputting past user actions from the database into a machine learning model; and
   transmitting instructions to the user computing device to modify a behavior of the application based on an output of the machine learning model.

2. The method of claim 1, wherein the request to identify the at least one past action identifies a target user action and wherein the results of the query identify a set of user actions performed prior to the target user action.

3. The method of claim 2, wherein providing the results include providing a user interface that includes a modified view of user entered content associated with the at least one past action and set of user actions.

4. The method of claim 2, wherein the results of the query identify code instrumentation data associated with program code executed for the target user action, the code instrumentation data indicating a success rate of the program code.

5. The method of claim 4, wherein the code instrumentation data is tagged with a correlation vector, the correlation vector initially assigned by the target user action.

6. The method of claim 1, further comprising:
authenticating a user as the user associated with the user action of the application.

7. The method of claim 6, wherein providing results of the query to the requesting computing device includes providing an option to revoke access to data associated with the at least one past user action of the user.

8. The method claim 6, wherein presenting results of the query to the requesting computing device includes presenting an option to delete data stored in the database associated with the user.

9. The method of claim 1, wherein the database is limited to data associated with a single user.

10. A system comprising:
processing circuitry; and
a memory device including instructions embodied thereon, wherein the instructions, which when executed by the processing circuitry, configure the processing circuitry to perform operations that:
receive user instrumentation data and code instrumentation data from a user computing device, the user and code instrumentation data associated with performance of a user action of an application, wherein the user instrumentation data includes:
a name identification of the user action;
an input type identification of the initiation of the user action; and
context data of the user action as executed;
store the user and code instrumentation data in a database, wherein the user instrumentation data is stored as associated with a user identification;
receive a request, from a requesting computing device, to identify at least one past user action of the user;
in response to receiving the request, query the database;
provide results of the query to the requesting computing device; and
input past user actions from the database into a machine learning model; and
transmit instructions to the user computing device to modify a behavior of the application based on an output of the machine learning model.

11. The system of claim 10, wherein the request to identify the at least one past action identifies a target user action and wherein the results of the query identify a set of user actions performed prior to the target user action.

12. The system of claim 11, wherein to provide the results, the processing circuitry is configured to perform an operation that provides a user interface that includes a modified view of user entered content associated with the at least one past action and set of user actions.

13. The system of claim 11, wherein the results of the query identify code instrumentation data associated with program code executed for the target user action, the code instrumentation data indicating a success rate of the program code.

14. The system of claim 13, wherein the code instrumentation data is tagged with a correlation vector, the correlation vector initially assigned by the target user action.

15. A non-transitory computer-readable medium comprising instructions, which when executed by at least one processor, configure the processor to:
receive user instrumentation data and code instrumentation data from a user computing device, the user and code instrumentation data associated with performance of a user action of an application, wherein the user instrumentation data includes:
a name identification of the user action;
an input type identification of the initiation of the user action; and
context data of the user action as executed;
store the user and code instrumentation data in a database, wherein the user instrumentation data is stored as associated with a user identification;
receive a request, from a requesting computing device, to identify at least one past user action of the user;
in response to receiving the request, query the database;
provide results of the query to the requesting computing device; and
input past user actions from the database into a machine learning model; and
transmit instructions to the user computing device to modify a behavior of the application based on an output of the machine learning model.

16. The non-transitory computer readable medium of claim 15, wherein the request to identify the at least one past action identifies a target user action and wherein the results of the query identify a set of user actions performed prior to the target user action.

17. The non-transitory computer readable medium of claim 16, wherein to provide the results, the processor is configured to provide a user interface that includes a modified view of user entered content associated with the at least one past action and set of user actions.

18. The non-transitory computer readable medium of claim 16, wherein the results of the query identify code instrumentation data associated with program code executed for the target user action, the code instrumentation data indicating a success rate of the program code.

19. The non-transitory computer readable medium of claim 18, wherein the code instrumentation data is tagged with a correlation vector, the correlation vector initially assigned by the target user action.

* * * * *